United States Patent
Li et al.

(10) Patent No.: US 12,414,176 B2
(45) Date of Patent: Sep. 9, 2025

(54) SUBGROUP WIRELESS OPERATIONS ON DYNAMIC FREQUENCY SELECTION (DFS) CHANNELS

(71) Applicant: META PLATFORMS TECHNOLOGIES, LLC, Menlo Park, CA (US)

(72) Inventors: Guoqing Li, Cupertino, CA (US); Dong Zheng, Saratoga, CA (US); Qi Qu, Redmond, WA (US); Jie Zhang, Newark, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 545 days.

(21) Appl. No.: 17/826,504

(22) Filed: May 27, 2022

(65) Prior Publication Data
US 2023/0389099 A1   Nov. 30, 2023

(51) Int. Cl.
| | |
|---|---|
| H04W 76/25 | (2018.01) |
| H04W 48/16 | (2009.01) |
| H04W 72/0453 | (2023.01) |
| H04W 72/20 | (2023.01) |
| H04W 76/15 | (2018.01) |

(52) U.S. Cl.
CPC .......... *H04W 76/15* (2018.02); *H04W 48/16* (2013.01); *H04W 72/0453* (2013.01); *H04W 72/20* (2023.01)

(58) Field of Classification Search
USPC ........................................ 370/329, 300, 315
See application file for complete search history.

(56) References Cited

U.S. PATENT DOCUMENTS

| | | | |
|---|---|---|---|
| 8,116,285 B1 * | 2/2012 | Barnum | H04W 28/18 370/338 |
| 9,794,308 B2 * | 10/2017 | Bruhn | H04L 65/61 |
| 9,930,670 B2 * | 3/2018 | Yi | H04W 4/021 |
| 2016/0261657 A1 * | 9/2016 | Bruhn | H04L 47/2416 |

(Continued)

FOREIGN PATENT DOCUMENTS

| | | | |
|---|---|---|---|
| EP | 3849241 A1 | | 7/2021 |
| JP | 2020031326 A | * | 2/2020 |
| JP | 7135584 B2 | * | 9/2022 |

OTHER PUBLICATIONS

International Search Report and Written Opinion for International Application No. PCT/US2023/023675, mailed Aug. 23, 2023, 16 pages.

*Primary Examiner* — Jung Liu
(74) *Attorney, Agent, or Firm* — Foley & Lardner LLP

(57) ABSTRACT

A first device may include a processor, a first wireless network interface, and a second wireless network interface. The processor may be configured to, while associating with the access point over a first wireless network on a first channel via the first wireless network interface, establish a second wireless network via the second wireless network interface. A group of client devices including one or more client devices can join the second wireless network on the first channel via the second wireless network interface. The processor may be configured to receive, via the first wireless network interface, first information from the access point. The processor may be configured to send, via the second wireless network interface, the first information to the group of client devices.

18 Claims, 6 Drawing Sheets

(56) References Cited

U.S. PATENT DOCUMENTS

| | | | |
|---|---|---|---|
| 2017/0142728 A1* | 5/2017 | Tsai | H04W 72/0453 |
| 2017/0245280 A1* | 8/2017 | Yi | H04K 3/00 |
| 2018/0035457 A1* | 2/2018 | Ngo | H04W 74/006 |
| 2018/0206165 A1* | 7/2018 | Hao | H04W 36/302 |
| 2018/0359730 A1* | 12/2018 | Jung | H04K 3/822 |
| 2019/0261243 A1* | 8/2019 | Amini | H04L 1/0033 |
| 2019/0342795 A1* | 11/2019 | McFarland | H04W 28/18 |
| 2021/0409961 A1* | 12/2021 | Changlani | H04W 48/16 |
| 2023/0164594 A1* | 5/2023 | Gupta | H04W 24/02 370/216 |
| 2023/0164595 A1* | 5/2023 | Gupta | H04W 16/18 370/255 |
| 2023/0217489 A1* | 7/2023 | Tseng | H04W 16/14 370/329 |
| 2023/0389099 A1* | 11/2023 | Li | H04W 76/15 |

\* cited by examiner

SUBGROUP WIRELESS OPERATIONS ON DYNAMIC FREQUENCY SELECTION (DFS) CHANNELS

FIELD OF DISCLOSURE

The present disclosure is generally related to communications, including but not limited to systems and methods for extending channel availability of a subgroup of wireless devices to dynamic frequency selection (DFS) channels.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space). An image of a virtual object may be generated by a computing device communicatively coupled to the HWD. In some embodiments, the computing device may have access to a network.

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency caused by interference between a movement of the user wearing the HWD and an image displayed corresponding to the user movement can cause judder, which may result in motion sickness and can degrade the user experience.

SUMMARY

In one aspect, disclosed herein are related to a first device including a processor, a first wireless network interface, and a second wireless network interface. The processor may be configured to, while associating with the access point over a first wireless network on a first channel via the first wireless network interface, establish a second wireless network via the second wireless network interface. A group of client devices including one or more client devices can join the second wireless network on the first channel via the second wireless network interface. The processor may be configured to receive, via the first wireless network interface, first information from the access point. The processor may be configured to send, via the second wireless network interface, the first information to the group of client devices.

In some embodiments, the first information may include information relating to at least one of channel availability or a radar event or a channel switch announcement. In some embodiments, the processor may be configured to maintain the second wireless network via the second wireless network interface while the first wireless network interface is disconnected from the first wireless network.

In some embodiments, the processor may be configured to determine, according to the first information, that the access point is to switch from the first channel to a second channel. The first channel may be a non-dynamic frequency selection (DFS) channel, the second channel may be a DFS channel, and the first information may be on switching to the second channel. The processor may be configured to maintain the second wireless network interface on the first channel until the access point successfully completes a channel availability check (CAC) on the second channel. In response to the access point successfully completing the CAC on the second channel, the processor may be configured to switch to the second channel using the first wireless network interface, and send the first information to the group of client devices via the second wireless network interface.

In some embodiments, the processor may be configured to determine, according to the first information, that the access point is to switch from the first channel to a third channel. The first channel may be a dynamic frequency selection (DFS) channel, the third channel may be a non-DFS channel, and the first information may include a channel switch announcement (CSA). The processor may be configured to perform an interference resolution procedure for switching to the third channel. The processor may be configured to send, via the second wireless network interface, the first information to the group of client devices within a determined time. The group of client devices can perform the interference resolution procedure according to the first information. In some embodiments, the determined time is less than or equal to one millisecond. In some embodiments, the processor may be configured to set a time limit for the group of client devices to switch to the third channel.

In some embodiments, the processor may be further configured to determine, according to second information, that the access point is to switch from the third channel to a fourth channel which is a DFS channel different from the first channel. The second information may be on switching to the fourth channel. The processor may be configured to maintain the second wireless network interface on the third channel until the access point successfully performs a channel availability check (CAC) on the fourth channel. In response to the access point successfully performing CAC on the fourth channel, the processor may be configured to switch to the fourth channel using the first wireless network interface, and send the second information to the group of client devices via the second wireless network interface.

In another aspect, disclosed herein are related to a method. The method may include while associating with an access point over a first wireless network on a first channel via a first wireless network interface of a first device, establishing, by the first device, a second wireless network via a second wireless network interface of the first device. A group of client devices comprising one or more client devices can join the second wireless network on the first channel via the second wireless network interface of the first device. The method may include receiving, via the first wireless network interface, first information from the access point. The method may include sending, via the second wireless network interface, the first information to the group of client devices.

In some embodiments, the first information may include information relating to at least one of channel availability or a radar event or a channel switch announcement.

In some embodiments, the first device may maintain the second wireless network via the second wireless network interface while the first wireless network interface is disconnected from the first wireless network.

In some embodiments, the first device may determine, according to the first information, that the access point is to switch from the first channel to a second channel. The first channel may be a non-dynamic frequency selection (DFS) channel, the second channel may be a DFS channel, and the first information may be on switching to the second channel. The first device may maintain the second wireless network interface on the first channel until the access point successfully completes a channel availability check (CAC) on the second channel. In response to the access point successfully completing the CAC on the second channel, the first device may switch to the second channel using the first wireless network interface. The first device may send the first information to the group of client devices via the second wireless network interface.

In some embodiments, the first device may determine, according to the first information, that the access point is to switch from the first channel to a third channel. The first channel may be a dynamic frequency selection (DFS) channel, the third channel may be a non-DFS channel, and the first information includes a channel switch announcement (CSA). The first device may perform an interference resolution procedure for switching to the third channel. The first device may send, via the second wireless network interface, the first information to the group of client devices within a determined time. The group of client devices can perform the interference resolution procedure according to the first information. The first device may set a time limit for the group of client devices to switch to the third channel.

In some embodiments, the first device may determine, according to second information, that the access point is to switch from the third channel to a fourth channel which is a DFS channel different from the first channel. The second information may be on (e.g., information used for) switching to the fourth channel. The first device may maintain the second wireless network interface on the third channel until the access point successfully performs a channel availability check (CAC) on the fourth channel. In response to the access point successfully performing CAC on the fourth channel, the first device may switch to the fourth channel using the first wireless network interface, and can send the second information to the group of client devices via the second wireless network interface.

In still another aspect, disclosed herein are related to a non-transitory processor-readable medium containing processor-readable instructions. When executed by one or more processors, the instructions may cause the one or more processors to, while associating with an access point over a first wireless network on a first channel via a first wireless network interface, establish a second wireless network via a second wireless network interface. A group of client devices including one or more client devices can join the second wireless network on the first channel via the second wireless network interface. The one or more processors may be caused to receive, via the first wireless network interface, first information from the access point, and send, via the second wireless network interface, the first information to the group of client devices.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
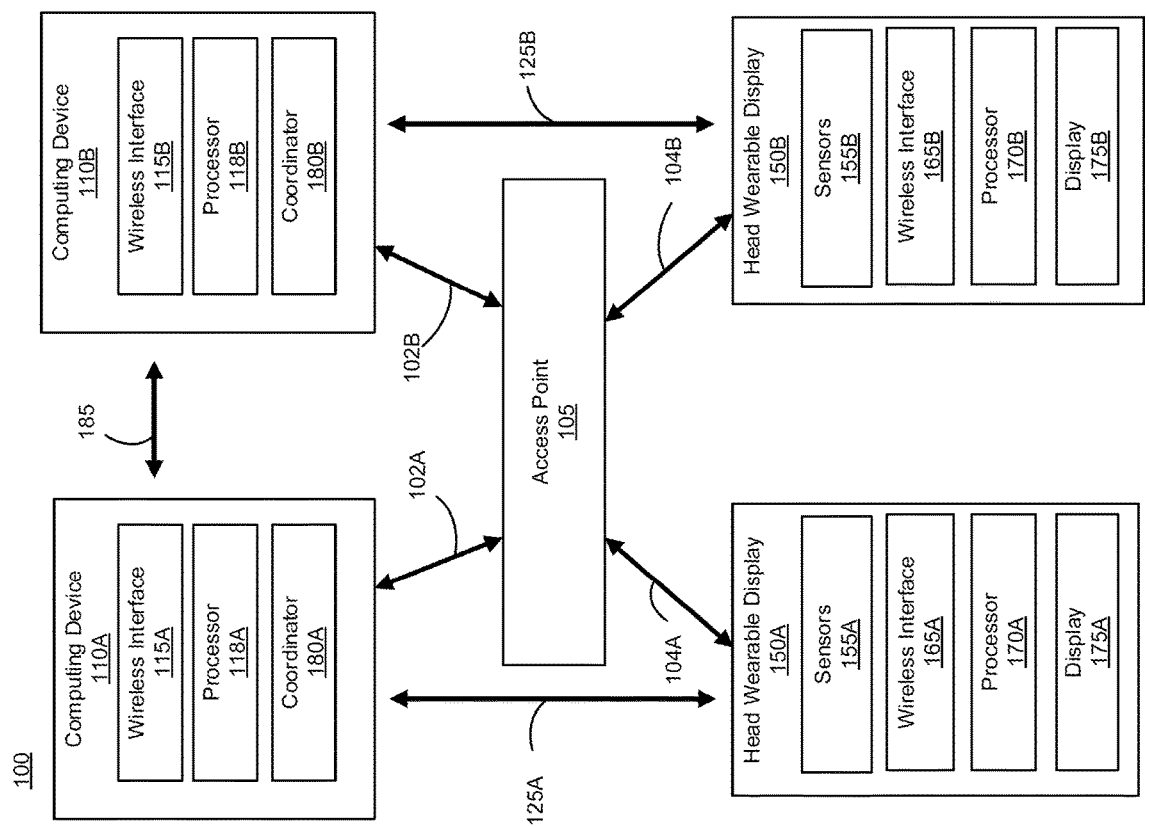
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are systems and methods of extending channel availability of a subgroup of wireless devices to dynamic frequency selection (DFS) channels. This disclosure relates to systems and methods of stably extending wireless operations of subgroup devices directed by an AP to DFS channels, when the AP moves between a DFS channel and a non-DFS channel, by (1) creating by a subgroup owner device (e.g., head wearable device (HWD)) a second wireless network separate from a first wireless network in which the subgroup owner device is associated with the AP, (2) allowing subgroup devices (e.g., AR/VR controllers or consoles) to join the second wireless network such that the subgroup devices can be indirectly associated with the AP via the subgroup owner device, and/or (3) sending or relaying, by the subgroup owner device, channel availability and/or radar events from the AP to subgroup devices through the second wireless network.

A subgroup may be defined as a client-to-client operation group directed by an access point ("AP") under the same wireless network, where a group owner interface of a group owner device ("GO device") can create a peer-to-peer network (e.g., Wi-Fi Direct network) and a plurality of subgroup clients ("GC devices") can associate to the GO device to create a subnetwork for operation where the GC devices are not directly associated with by the AP. A subgroup created under a Wi-Fi network may perform wireless transmission/receptions on a Wi-Fi channel. For example, a subgroup may be created using a soft-AP mode where limited active scan features are enabled. A subgroup may be created using a client-to-client operation via a wireless modem. In this case, radar detection features or channel availability check procedures for client devices may not be available in the subgroup. As a result, the subgroup is unable to clear radar on DFS channels. A subgroup may be created using a peer-to-peer network (e.g., Wi-Fi Direct) via a wireless modem. In this case, such peer-to-peer networks may exclude DFS channels operation from their functions. As intralinks (e.g., intralink between a HWD and an AR/VR controller) may require cleaner and unoccupied channels, there is a need/benefit to extend channel availability of a subgroup of devices to DFS channels (e.g., 5.25 GHz and 5.73 GHz frequency range) so as to prevent channel occupation limitation based on spectrum sharing features set forth in the 802.11 standard.

To solve this problem, according to certain aspects, embodiments in the present disclosure relate to techniques for improving throughput and stability of intralinks (e.g., intralink between a HWD and an AR/VR controller) by introducing DFS channel operations on a subgroup to extend channel availability and increase utilization of spectrum of a wireless network (e.g., 802.11 network).

In one approach, when an AP moves or switches between a DFS channel and a non-DFS channel, channel availability for a subgroup of client devices can be extended by (1) creating, by a subgroup owner device ("GO device"; e.g., HWD), a second wireless network separate/different from a first wireless network in which the GO device is associated with the AP, (2) allowing subgroup client devices ("GC devices"; e.g., AR/VR controllers) to join the second wireless network such that the subgroup devices can be indirectly associated with the AP via the subgroup owner device, and/or (3) relaying, by the GO device, channel availability and/or radar events from the AP to GC devices through the second wireless network.

In one approach, a GO device of a subgroup may have a wireless module (e.g., Wi-Fi modem or Wi-Fi network stack) configured create separate wireless interfaces (e.g., Wi-Fi interfaces). In some embodiments, the GO device may include (1) a first wireless interface (or "station interface") to associate with an AP as a standard network client (e.g., standard Wi-Fi client) and (2) a second wireless interface ("group owner (GO) interface") configured to create a peer-to-peer network (e.g., Wi-Fi Direct network) or a wireless network formed by a software enabled access point (e.g., Soft-AP) as a subgroup network and cause one or more GC devices to associate with the peer-to-peer network. In some embodiments, when the station interface association is established on a channel, the GO device may broadcast the channel based on a station interface link. If a station interface link becomes offline, the GO interface may act as a standard subgroup owner which supports standard Wi-Fi subgroup operations. In some embodiments, GC devices that can join the subgroup network as a client may be limited to standard clients only, and may be associated with the AP via the GO device. In some embodiments, the GO device may relay or send channel switch announcement (CSA) relating to channel availability and/or radar event, to GC devices using an interface application programming interface (API).

In one approach, in a "non-DFS to DFS" case where an AP attempts to move (e.g., switch or transition) from a non-DFS channel to a DFS channel ("proposed DFS channel") in response to detection of a radar event, subgroup wireless operation (e.g., DFS channel operation) may be performed as follows. In a first step, a GO device may keep/maintain associating with the current non-DFS channel before the proposed DFS channel is cleared by a channel availability check (CAC) procedure implemented in the AP. In a second step, when the proposed DFS channel is cleared by the CAC procedure is not on a channel blacklist, a station interface of the GO device may receive a direction/instruction from the AP and can move, according to the direction, to the proposed DFS channel. The GO device may then send or relay information relating to the channel switch, to GC devices through a GO interface of the GO device. In a third step, the station interface of the GO device may continue to monitor a channel switch announcement (CSA) from the AP while acting as a DFS client. When the GO device receives a CSA from the AP, the GO device may send or relay the CSA to the GC devices.

In one approach, in a "DFS to non-DFS" scenario where an AP attempts to move from a DFS channel to a non-DFS channel ("proposed non-DFS channel"), subgroup wireless operation (e.g., DFS channel operation) may be performed as follows. In a first step, when a station interface of a GO device receives a channel switch announcement (CSA) and channel switching information from the AP, the station interface may perform channel switch and association with the proposed non-DFS channel according to a standard interference resolution procedure (e.g., the standard 802.11h management procedure) so that the GO device can relay the CSA and the channel switching information to GC devices, and the GC devices can perform a channel switch according to the standard interference resolution procedure. In a second step, the GO device may control or configure the time for the relay of the channel switching information to be less than a first time duration (e.g., 1 ms) and can configure a target switch time for the GC devices to be less than a second time duration (e.g., in a millisecond scale or less than one second), using an interface API. In a third step, the GO device may create or generate an interface control signal or an interface control frame to contain the CSA and the channel switching information for the GC devices, as specified in the standard interference resolution procedure. The GO device may send or relay the CSA and channel switching information to the GC devices through a GO interface of the GO device within the first time duration by transmitting the interface control signal or the interface control frame to the GC devices. In a fourth step, The GC devices may perform a channel switch to the proposed non-DFS channel within the second time duration (e.g., less than one second) following the standard interference resolution procedure.

In one approach, in a "DFS to DFS" scenario where an AP attempts to move from a DFS channel to another DFS channel ("proposed DFS channel"), subgroup wireless operation (e.g., DFS channel operation) may be performed as follows. In a first step, a GO device may perform the first step to the third step in the "DFS to non-DFS" scenario. In a second step, before switching to the proposed DFS channel, the station interface of the GO device may wait for the AP to complete a channel availability check for a predetermined time (e.g., 60 seconds) while maintaining the station interface link (e.g., interlink network interface) on the current non-DFS channel. The GO device may then proceed to the second and third steps in the "non-DFS to DFS" scenario.

In one approach, a GO device may associate with an AP via a first wireless interface of the GO device, and can associate with GC devices via a second wireless interface. The GO device may determine whether the current channel used by the first wireless interface is a DFS channel or a non-DFS channel. In response to determining that the current channel is a non-DFS channel, the GO device may receive, from the AP via the first wireless interface, DFS channel information indicating a proposed DFS channel. The GO device may determine whether a channel availability check (CAC) is cleared on the proposed DFS channel. In response to determining that the CAC is cleared, the GO device may switch, via the first wireless interface, to the proposed DFS channel. The GO device may receive, from the AP via the first wireless interface, channel switch announcement (CSA) and can relay, via the second wireless interface, the CSA to GC devices. In response to receiving the CSA from the GO device, the GC devices may switch to the DFS channel.

In response to determining that the current channel is a DFS channel, in response to a channel switch triggering event (e.g., detection of a radar event or detection of channel being unavailable), the GO device may receive, from the AP via the first wireless interface, a channel switch announcement (CSA) and/or channel switching information. The GO device may switch, via the first wireless interface, to a non-DFS channel according to a standard interference resolution procedure (e.g., 802.11h), and can send or relay, via the second wireless interface, the CSA and/or channel switching information to the GC devices. The GC devices may switch to the non-DFS channel according to the standard interference resolution procedure. The GO device may determine whether DFS channel information is received from the AP. In response to determining that DFS channel information indicating a second proposed DFS channel is received, the GO device may wait, via the first and second interfaces of GO device, for the AP to complete a channel availability check of the second proposed DFS channel for a predetermined time (e.g., 60 seconds), and can then proceed to the step of determining whether a channel availability check (CAC) is cleared on the second proposed DFS channel.

In one approach, a GO device may create a second wireless network interface (e.g., subgroup network interface) while associating with an AP through a first wireless network interface (e.g., interlink network interface). The GO device may broadcast a new channel through the first wireless network interface while associating with the AP. When the first wireless network interface becomes offline, the GO device may allow GC device to join a wireless network on the new channel through the second wireless network interface such that GC devices can be indirectly associated with the AP via the GO device. Upon receiving from the AP information on channel availability and/or radar events, the GO device may execute an interface control API to relay the information to GC devices through the second wireless network interface.

In some embodiments, the GO device may determine that the AP moves from a non-DFS channel to a DFS channel, and can maintain the first wireless network interface (e.g., interlink network interface) to be associated with the non-DFS channel until the AP clears a channel availability check (CAC) on the DFS channel. In response to the AP clearing the CAC on the DFS channel, the GO device may switch to the DFS channel through the first wireless network interface, and can relay or send information on the channel switch to the GC devices through the second wireless network interface.

In some embodiments, in response to receiving from the AP a channel switch announcement (CSA) that the AP moves from a first DFS channel to a first non-DFS channel (e.g., when the AP detects or receives a radar signal), the GO device may follow an interference resolution procedure (e.g., 802.11h) for channel switch and association. The GO device may relay channel switch information according to the procedure to GC devices through the second wireless network interface within a millisecond scale (e.g., less than 1 second). The GO device may configure a time for the GC devices to switch to the first non-DFS channel. For example, the GO device may configure the time for switching within a specific number of milliseconds (e.g., 256 milliseconds).

In some embodiments, the GO device may determine that the AP moves from the first non-DFS channel to the second DFS channel different from the first DFS channel, and maintain the first wireless network interface to be associated with the first non-DFS channel until the AP clears the CAC on the second DFS channel. In response to the AP clearing the CAC on the second DFS channel, the GO device may switch to the second DFS channel through the first wireless network interface, and can relay information on the channel switch to the GC devices through the second wireless network interface.

In one approach, a first device may include a processor, a first wireless network interface (e.g., interlink network interface), and a second wireless network interface (e.g., subgroup network interface). The processor may be configured to, while associating with the access point over a first wireless network on a first channel via the first wireless network interface, establish a second wireless network via the second wireless network interface. A group of client devices including one or more client devices can join the second wireless network on the first channel via the second wireless network interface. The processor may be configured to receive, via the first wireless network interface, first information from the access point. The processor may be configured to send, via the second wireless network interface, the first information to the group of client devices.

In some embodiments, the first information may include information relating to at least one of channel availability or a radar event or a channel switch announcement.

In some embodiments, the processor may be configured to maintain the second wireless network via the second wireless network interface while the first wireless network interface is disconnected from the first wireless network.

In some embodiments, the processor may be configured to determine, according to the first information, that the access point is to switch from the first channel to a second channel. The first channel may be a non-dynamic frequency selection (DFS) channel, the second channel may be a DFS channel, and the first information may be on switching to the second channel. The processor may be configured to maintain the second wireless network interface (e.g., subgroup network interface) on the first channel until the access point successfully completes a channel availability check (CAC) on the second channel. In response to the access point successfully completing the CAC on the second channel, the processor may be configured to switch to the second channel using the first wireless network interface, and can send the first information to the group of client devices via the second wireless network interface.

In some embodiments, the processor may be configured to determine, according to the first information, that the access point is to switch from the first channel to a third channel. The first channel may be a dynamic frequency selection (DFS) channel, the third channel may be a non-DFS channel, and the first information may include a channel switch announcement (CSA). The processor may be configured to perform an interference resolution procedure for switching to the third channel. The processor may be configured to send, via the second wireless network interface, the first information to the group of client devices within a determined time. The group of client devices can perform the interference resolution procedure according to the first information. In some embodiments, the determined time is less than or equal to one millisecond. In some embodiments, the processor may be configured to set a time limit for the group of client devices to switch to the third channel.

In some embodiments, the processor may be further configured to determine, according to second information, that the access point is to switch from the third channel to a fourth channel which is a DFS channel different from the first channel. The second information may be on switching to the fourth channel. The processor may be configured to maintain the second wireless network interface on the third channel until the access point successfully performs a channel availability check (CAC) on the fourth channel. In response to the access point successfully performing CAC on the fourth channel, the processor may be configured to switch to the fourth channel using the first wireless network interface, and can send the second information to the group of client devices via the second wireless network interface.

Embodiments in the present disclosure have at least the following advantages and benefits.

First, embodiments in the present disclosure can provide useful techniques for improving throughput and satisfying regulatory requirements (e.g., 47 CFR § 15.407) in a millisecond scale. For example, a fine control of channel switch reply can be performed through an API control to satisfy the regulatory requirement in a millisecond scale. In this manner, the techniques can comply with the regulation and system key performance indicator (KPI) based on subgroup DFS operations through an interface switch and the API control.

Second, embodiments in the present disclosure can provide useful techniques for extending channel availability for a subgroup to DFS channels, thereby increasing utilization of spectrum of a wireless network (e.g., 802.11 network) for subgroup intralink operation. A subgroup directed by an AP including an HWD and other client devices can stably perform wireless operations on DFS channels despite radar events or changes in channel availability.

Third, embodiments in the present disclosure can provide useful techniques for performing a channel switch of a subgroup including a plurality of client devices. For example, a group owner device has separate wireless interfaces for relaying control information to other subgroup client devices, thereby efficiently and stably directing the subgroup to perform appropriate channel operation.

Various applications, use cases, and further implementations of the systems and methods described herein are described in greater detail below.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a computing device or a mobile device that can retrieve content from the access point 105, and can provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (referred to herein as wireless link 102) respectively. The communication between the AP 105 and computing device 110 may be considered "interlink communication" or "infrastructure traffic," in which the AP 105 and the computing devices 110 communicate using an infrastructure link/AP link 102. Similarly, the HWDs 150A, 150B can communicate with the access point 105 through wireless links 104A, 104B (referred to herein as wireless link 104) respectively. The communication between the AP 105 and HWDs 150 may be considered "interlink communication" or "infrastructure traffic," in which the AP 105 and the HWDs 150 can communicate using an infrastructure link/AP link 104.

In some embodiments, the computing device 110A communicates with the HWD 150A, HWD 150B through wireless links 125A, 125B (referred to herein as wireless link 125) respectively. The communication between the computing devices 110 and the HWDs 150 may be considered "intralink communication" (e.g., a peer-to-peer link) or "non-infrastructure traffic". In some embodiments, functionality of one or more components of the artificial reality system environment 100 can be distributed among the components in a different manner than is described here. For example, some of the functionality of the computing device 110 may be performed by the HWD 150. Additionally or alternatively, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110 or the access point 105, other HWDs 150, or any combination of them. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink communication). The wireless interface 165 may also communicate with the access point 105 through a wireless link 104 (e.g., interlink communication). Examples of the wireless link 125 and the wireless link 104 include a near field communication link, Wi-Fi direct, Bluetooth, or any wireless communication link. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. In some embodiments, the computing device 110 is a controller configured to allow a user to interact with the HWD 150. In some embodiments, the computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a field of view of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink communication). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink communication). The wireless interface 115 may also include a component to communicate with the access point 105 through a wireless link 102 (e.g., interlink communication). Examples of wireless link 102 include a cellular communication link, a near field communication link, Wi-Fi, Bluetooth, 60 GHz wireless link, or any wireless communication link. The wireless interface 115 may also include a component to communicate with a different computing device 110 through a wireless link 185. Examples of the wireless link 185 include a near field communication link, Wi-Fi direct, Bluetooth, or any wireless communication link. Through the wireless link 102 (e.g., interlink communication), the wireless interface 115 may obtain AR/VR content, or other content from the access point 105.

Through the wireless link 125 (e.g., intralink communication), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink communication), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118 may configure or cause the wireless interfaces 115 to toggle, transition, cycle or switch between a sleep mode and a wake up mode. In the wake up mode, the processor 118 may enable the wireless interface 115 such that the wireless interfaces 115 may exchange data. In the sleep mode, the processor 118 may disable the wireless interface 115 (e.g., may implement low power or reduced operation) such that the wireless interfaces 115 may not consume power, or may reduce power consumption. The processors 118 may schedule the wireless interfaces 115 to switch between the sleep mode and the wake up mode periodically every frame time (e.g., 11 ms or 16 ms). For example, the wireless interfaces 115 may operate in the wake up mode for 2 ms of the frame time, and the wireless interfaces 115 may operate in the sleep mode for the remainder (e.g., 9 ms) of the frame time. By disabling the wireless interfaces 115 in the sleep mode, power consumption of the computing device 110 and the HWD 150 can be reduced or minimized.

In some embodiments, the processors 118 may configure or cause the wireless interfaces 115 to resume communication based on stored information indicating communication between the computing device 110 and the HWD 150. In the wake up mode, the processors 118 may generate and store information (e.g., channel, timing) of the communication between the computing device 110 and the HWD 150. The processors 118 may schedule the wireless interfaces 115 to enter a subsequent wake up mode according to timing of the previous communication indicated by the stored information. For example, the wireless interfaces 115 may predict/determine when to enter the subsequent wake up mode, according to timing of the previous wake up mode, and can schedule to enter the subsequent wake up mode at the predicted time. After generating and storing the information and scheduling the subsequent wake up mode, the processors 118 may configure or cause the wireless interfaces 115 to enter the sleep mode. When entering the wake up mode, the processors 118 may cause or configure the wireless interfaces 115 to resume communication via the channel or frequency band of the previous communication indicated by the stored information. Accordingly, the wireless interfaces 115 entering the wake up mode from the sleep mode may resume communication, while bypassing a scan procedure to search for available channels and/or performing handshake or authentication. Bypassing the scan procedure allows extension of a duration of the wireless interfaces 115 operating in the sleep mode, such that the computing device 110 and the HWD 150 can reduce power consumption.

In some embodiments, the computing devices 110A, 110B may coordinate operations to reduce collisions or interferences. In one approach, the computing device 110A may transmit a beacon frame periodically to announce/advertise a presence of a wireless link 125A between the computing device 110A and the HWD 150A and can coordinate the communication between the computing device 110A and the HWD 150A. The computing device 110B may monitor for or receive the beacon frame from the computing device 110A, and can schedule communication with the HWD 150B (e.g., using information in the beacon frame, such as an offset value) to avoid collision or interference with communication between the computing device 110A and the HWD 150A. For example, the computing device 110B may schedule the computing device 110B and the HWD 150B to enter a wake up mode, when the computing device 110A and the HWD 150A operate in the sleep mode. For example, the computing device 110B may schedule the computing device 110B and the HWD 150B to enter a sleep up mode, when the computing device 110A and the HWD 150A operate in the wake up mode. Accordingly, multiple computing devices 110 and HWDs 150 in proximity (e.g., within 20 ft) may coexist and operate with reduced interference.

In some embodiments, a coordinator 180 (e.g., coordinator 180A of the computing device 110A and/or coordinator 180B of the computing device 110B) may coordinate traffic communicated on wireless link 125 (intralink communication) and wireless link 102 (interlink communication). To coordinate traffic of the three devices (e.g., computing device 110, HWDs 150, and AP 105), the coordinator 180 may coordinate (request, communicate), with the AP 105 using wireless link 102, traffic information to be communicated between the computing devices 110 and the HWDs 150 on wireless link 125. The traffic information to be communicated may include delay/latency/prioritization information, throughput information, tolerable packet loss, a size of the traffic to be communicated, a duration of the traffic to be communicated, orientation/motion data such as inertial measurement unit (IMU) data, etc.

Figure 2:
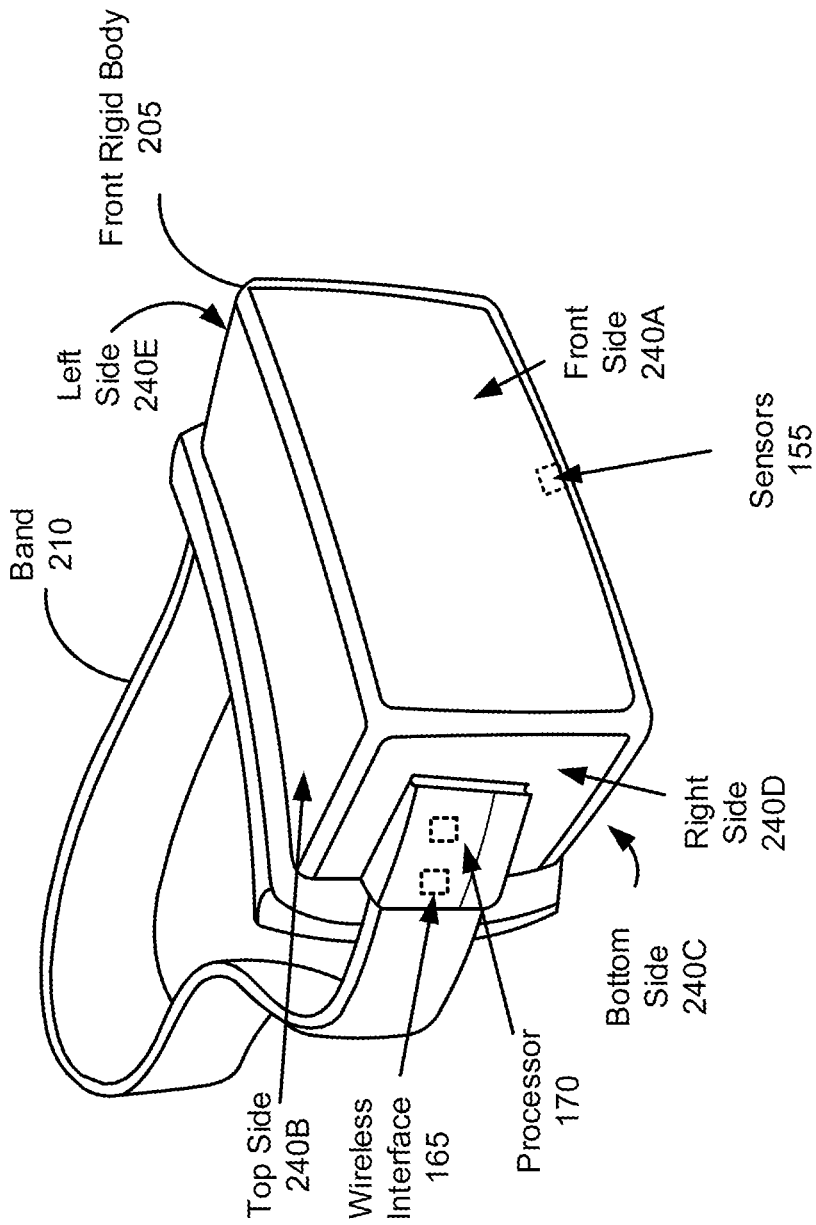
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205, a left side 240E, a front side 240A, a right side 240D, a bottom side 240C, a top side 240B, and a band 210. The front rigid body 205 includes the electronic display 175 (not shown in FIG. 2), the lens 180

(not shown in FIG. 2), the sensors 155, the eye trackers 160A, 160B, (not shown) the communication interface (wireless interface) 165, and the processor (image renderer) 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
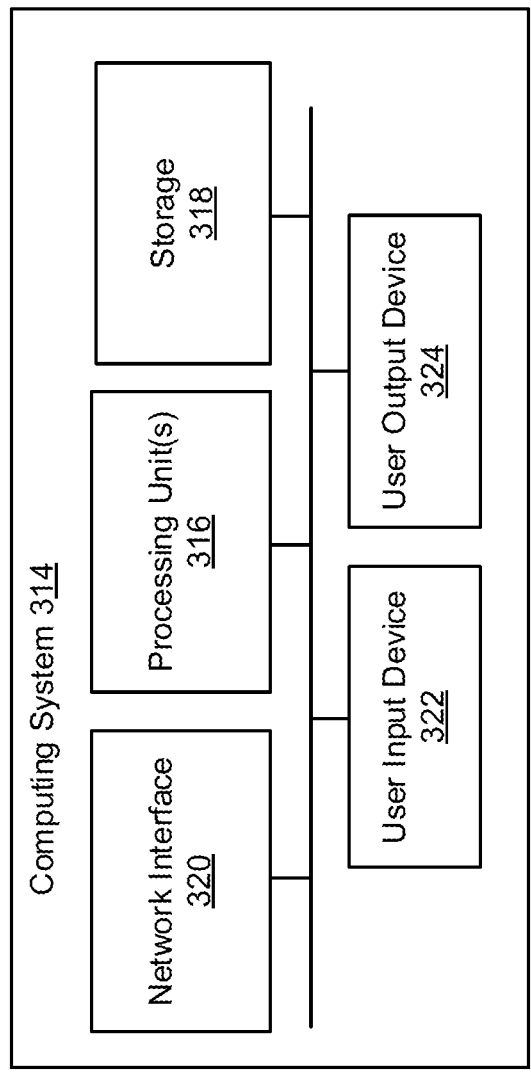
FIG. 3 is a block diagram of an artificial reality environment, according to an example implementation of the present disclosure.

Various operations described herein can be implemented on computer systems. FIG. 3 shows a block diagram of a representative computing system 314 usable to implement the present disclosure, in accordance with an example embodiment. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests for information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 4:
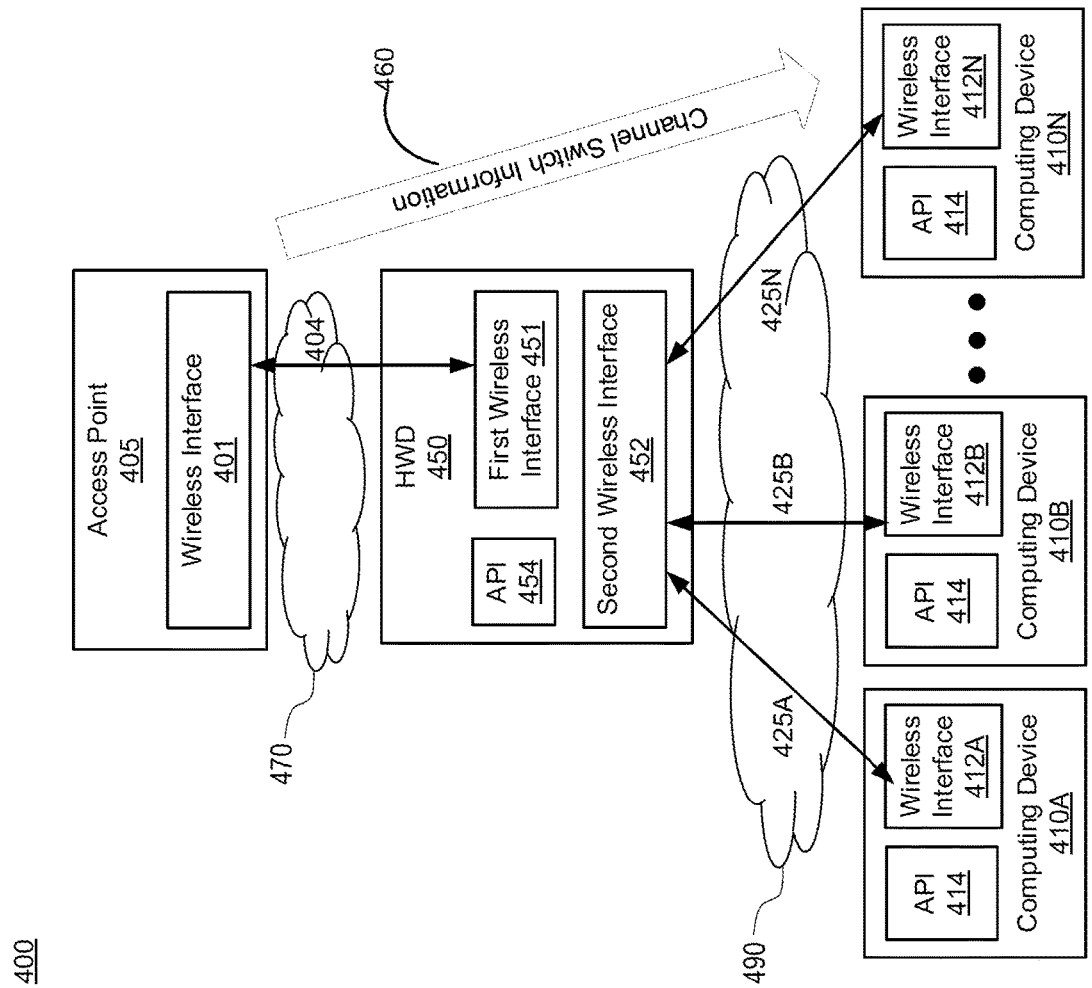
FIG. 4 is a block diagram of an example system environment for operations of a subgroup of wireless devices, according to an example implementation of the present disclosure.

FIG. 4 is a block diagram of an example system environment 400 for operations of a subgroup of wireless devices, according to an example implementation of the present disclosure. In some embodiments, the system environment 400 includes an access point (AP) 405 including a wireless interface 401, a HWD 450, and one or more computing devices 410 (computing devices 410A, 410B, ..., 410N) including respective wireless interfaces 412 (wireless interfaces 412A, 412B, ..., 412N). The AP 405 may have a configuration similar to that of AP 105, the HWD 450 may have a configuration similar to that of HWD 150, and the computing devices 410 may have a configuration similar to that of computing devices 110 (see FIG. 1).

In some embodiments, the HWD 450 may comprise and/or function as a group owner device ("GO device") of a subgroup, and the computing devices 410 may comprise and/or function as subgroup client devices ("GC devices") of the subgroup. The GO device 450 may have a wireless module (e.g., Wi-Fi modem or Wi-Fi network stack) configured to create separate wireless interfaces (e.g., separate Wi-Fi interfaces). For example, the GO device 450 may include a first wireless interface 451 (or "station interface") and a second wireless interface 452 (or "group owner (GO) interface"). The first wireless interface 451 may be configured to associate with the AP 405 via an interlink (or "station interface link") 404 as a standard network client (e.g., standard Wi-Fi client) in a first wireless network 470 (e.g., standard Wi-Fi network). The second wireless interface 452 may be configured to create a second wireless network 490 (e.g., Wi-Fi Direct network or a network formed by a software enabled access point) as a subgroup network and cause one or more GC devices 410 to associate with the second wireless interface 452 via intralinks 425 (e.g., intralinks 425A, 425B, ..., 425N) in the second wireless network 490.

In some embodiments, when association of the first wireless interface 451 with the AP is established on a channel, the GO device 450 may broadcast the channel based on the station interface link 404. If the station interface link 404 becomes offline, the GO interface 452 may act as a standard subgroup owner which supports standard Wi-Fi subgroup operations. In some embodiments, the GC devices 410 that can join the subgroup network as a client may be limited to standard clients only, and may be associated with the AP 405 via the GO device 450. In some embodiments, the GO device 450 may relay or send channel switch information 460 to GC devices 410 using an interface application programming interface (API) 454 of the GO device 450 and an interface API 414 of each GC device 410. The channel switch information 460 may include at least one of (1) channel information indicating a proposed DFS channel or a proposed non-DFS channel, (2) channel switch announcement (CSA) relating to channel availability and/or radar event, or (3) a result of channel availability check (CAC).

Figure 5:
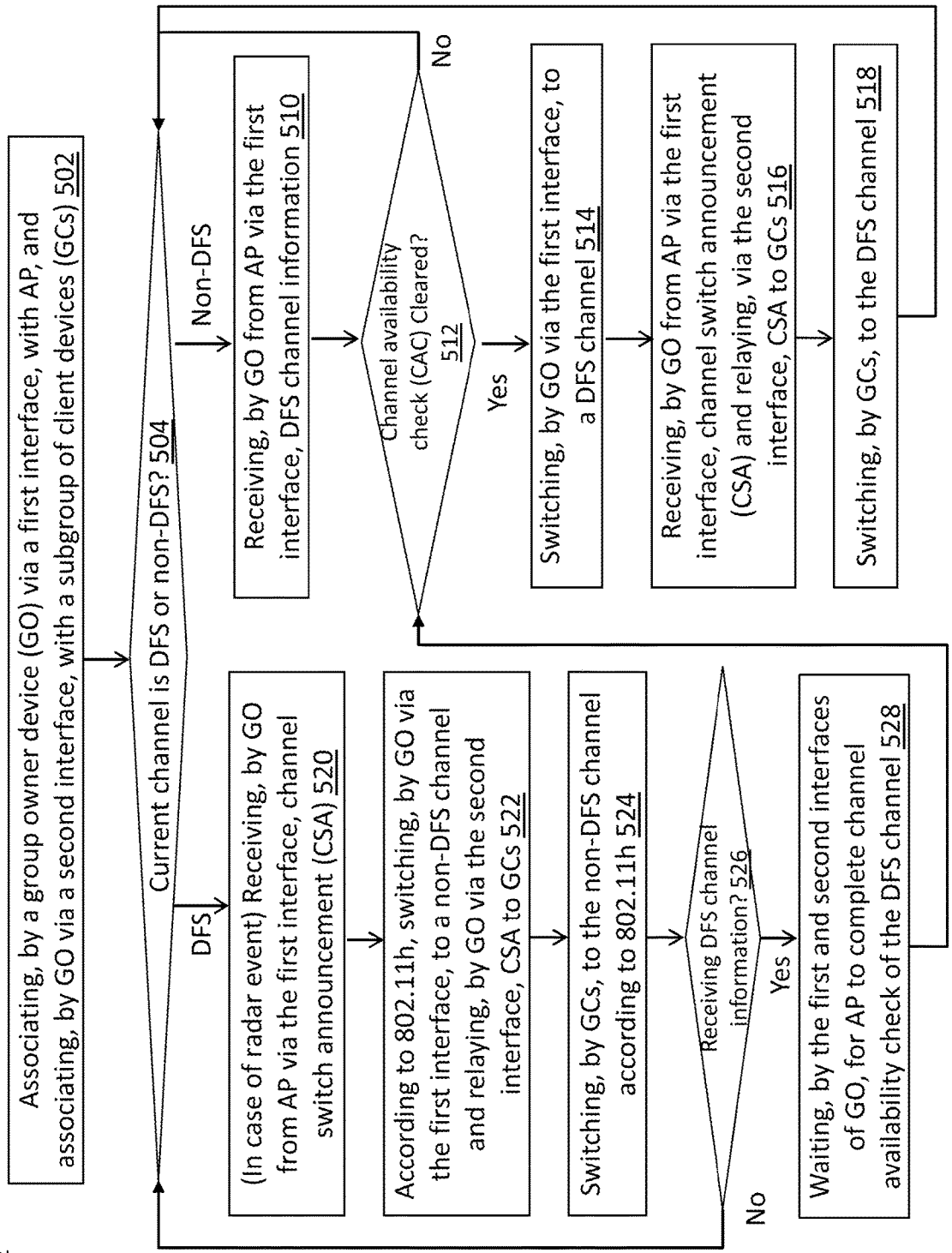
FIG. 5 is a flowchart showing a process of switching channels of a subgroup of wireless devices according to channel switches of an access point (AP), according to an example implementation of the present disclosure.

FIG. 5 is a flowchart showing a process 500 of switching channels of a subgroup of wireless devices according to channel switches of an access point (AP), according to an example implementation of the present disclosure. In some embodiments, the process 500 is performed by a group owner device (hereinafter "GO device"; e.g., HWD 150A, 150B, or 450) including a first wireless network interface (e.g., interlink network interface such as first wireless interface 451) and a second wireless network interface (e.g., subgroup network interface such as second wireless interface 452), and a subgroup of client devices ("GC devices"; e.g., computing devices 110A, 110B, 410A, 410B, ..., 410N). Alternatively, in some embodiments, a GO device may be a computing device (e.g., computing device 110A, 110B, 410A, 410B, ..., or 410N), and GC devices may be a subgroup of HWDs (e.g., HWDs 150A, 150B, or 450). In some embodiments, the process 500 is performed by other entities. In some embodiments, the process 500 includes more, fewer, or different steps than shown in FIG. 5.

In one approach, a GO device (e.g., HWD 150A, 150B, or 450) may associate 502 with an AP (e.g., AP 105, 405) via a first wireless interface of the GO device (e.g., first wireless interface 451), and can associate with GC devices via a second wireless interface of the GO device (e.g., second wireless interface 452).

In one approach, the GO device may determine 504 whether the current channel (e.g., channel used by the first wireless interface 451) is a DFS channel or a non-DFS channel. In one approach, in response to determining that the current channel is a non-DFS channel ("Non-DFS" in step 504), the GO device may receive 510, from the AP via the first wireless interface, DFS channel information indicating a first proposed DFS channel. For example, the GO device may receive the DFS channel information as channel switch information 460 (see FIG. 4).

In one approach, the GO device may determine 512 whether a channel availability check (CAC) is cleared (e.g., completed successfully) on the first proposed DFS channel. In one approach, in response to determining that the CAC is cleared, the GO device may switch 514, via the first wireless interface, to the first proposed DFS channel. In one approach, in response to determining that the CAC is not cleared, the GO device may proceed to step 504.

In one approach, the GO device may receive 516, from the AP via the first wireless interface, channel switch announcement (CSA) and can relay, via the second wireless interface, the CSA to GC devices (e.g., computing devices 110A, 110B, 410A, 410B, ..., 410N). For example, the GO device may receive and relay the CSA as channel switch information 460 (see FIG. 4). In some embodiments, the CSA may include information relating to channel availability and/or radar event. In one approach, in response to receiving the CSA from the GO device, the GC devices may switch 518 to the first proposed DFS channel.

In one approach, in response to determining that the current channel is a DFS channel ("DFS" in step 504), in response to a channel switch triggering event (e.g., AP's detection of a radar event or detection of channel being unavailable), the GO device may receive 520, from the AP via the first wireless interface, a channel switch announcement (CSA) and/or channel switching information (e.g., channel switching information 460). In one approach, the GO device may switch 522, via the first wireless interface, to a non-DFS channel according to a standard interference resolution procedure (e.g., 802.11h), and can send or relay, via the second wireless interface, the CSA and/or channel switching information to the GC devices. In one approach, the GC devices (e.g., computing devices 110A, 110B, 410A, 410B, ..., 410N) may switch 524 to the non-DFS channel according to the standard interference resolution procedure.

In one approach, the GO device may determine 526 whether DFS channel information is received from the AP (as channel switch information 460 in FIG. 4). In one approach, in response to determining that DFS channel information indicating a second proposed DFS channel (which may be different from the first proposed DFS channel) is received, the GO device may wait 528, via the first and second interfaces of GO device, for the AP to complete a channel availability check of the second proposed DFS channel for a predetermined time (e.g., 60 seconds), and can then proceed to the step 512 of determining whether a channel availability check (CAC) is cleared on the second proposed DFS channel. In one approach, in response to determining that DFS channel information is not received, the GO device may proceed to step 504.

Figure 6:
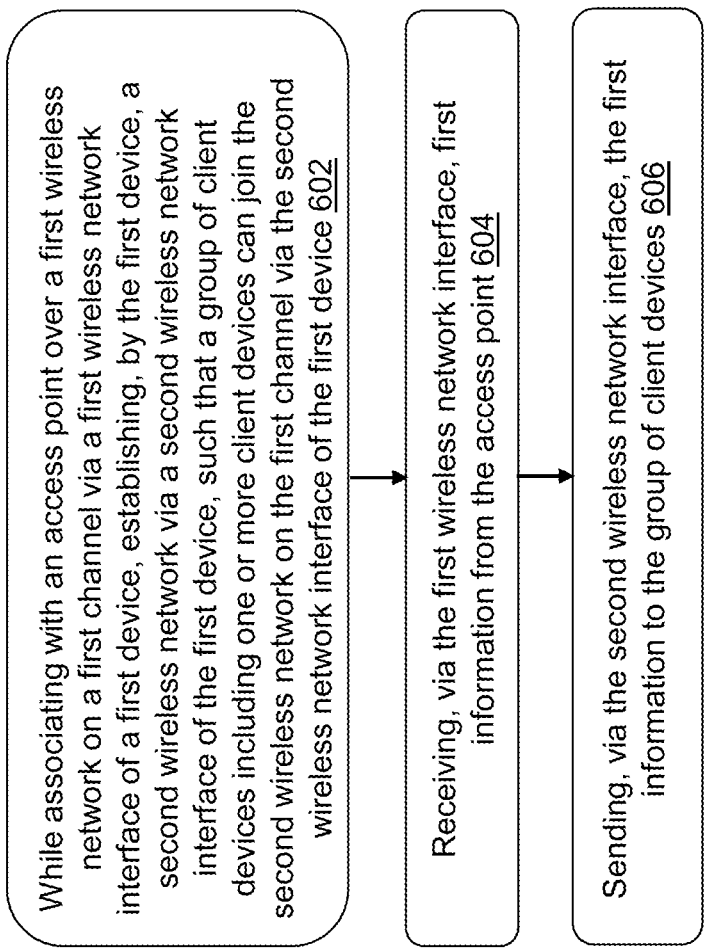
FIG. 6 is a flowchart showing a process of switching channels of a subgroup of wireless devices according to channel switches of an access point (AP), according to an example implementation of the present disclosure.

FIG. 6 is a flowchart showing a process 600 of switching channels of a subgroup of wireless devices according to channel switches of an access point (AP), according to an example implementation of the present disclosure. In some embodiments, the process 600 is performed by a first device (e.g., HWD 150A, 150B, or 450) including a processor, a first wireless network interface (e.g., first wireless interface 451) and a first wireless network interface (e.g., second wireless interface 452), and a group of client devices (e.g., computing device 110A, 110B, 410A, 410B, ..., or 410N). Alternatively, in some embodiments, the first device may be a computing device (e.g., computing device 110A, 110B, 410A, 410B, ..., or 410N), and the group of client devices may be a group of HWDs (e.g., HWDs 150A, 150B, or 450). In some embodiments, the process 600 is performed by other entities. In some embodiments, the process 600 includes more, fewer, or different steps than shown in FIG. 6.

In one approach, while associating with an access point (e.g., AP 105, 405) over the first wireless network (e.g., first wireless network 470) on a first channel via the first wireless network interface (e.g., first wireless interface 451), the processor of the first device (e.g., HWD 150A, 150B, or 450) may establish 602 a second wireless network (e.g., second wireless network 490) via the second wireless network interface (e.g., second wireless interface 452). For example, the first wireless network may be a standard Wi-Fi network, and the second wireless network may be a peer-to-peer network (e.g., Wi-Fi direct) or a network created by a software enabled access point. A group of client devices including one or more client devices (e.g., computing device 110A, 110B, 410A, 410B, . . . , or 410N) can join the second wireless network on the first channel via the second wireless network interface.

In some embodiments, the processor may maintain the second wireless network (e.g., second wireless network 490) via the second wireless network interface (e.g., second wireless interface 452) while the first wireless network interface (e.g., first wireless interface 451) is disconnected from the first wireless network (e.g., first wireless network 470). For example, the processor may maintain the second wireless network via the second wireless network interface while the first wireless network interface is offline/unconnected.

In one approach, the processor may receive 604, via the first wireless network interface, (e.g., first wireless interface 451) first information (e.g., channel switch information 460) from the access point (e.g., AP 105, 405). In some embodiments, the first information may include information relating to at least one of channel availability or a radar event or a channel switch announcement (CSA). In some embodiments, the first information may include information about (e.g., to assist in) switching from the current channel to a different channel.

In one approach, the processor may send or relay 606, via the second wireless network interface (e.g., second wireless interface 452), the first information (e.g., channel switch information 460) to the group of client devices. In some embodiments, the processor may be configured to determine, according to the first information, that the access point is to switch from the first channel to a second channel (e.g., a non-DFS channel to a DFS channel). The first channel may be a non-dynamic frequency selection (DFS) channel, the second channel may be a DFS channel, and the first information may be on switching to the second channel. The processor may be configured to maintain the second wireless network interface on the first channel (e.g., non-DFS channel) until the access point successfully completes a channel availability check (CAC) on the second channel (e.g., DFS channel). In response to the access point successfully completing the CAC on the second channel (e.g., DFS channel), the processor may be configured to switch to the second channel (e.g., DFS channel) using the first wireless network interface (e.g., first wireless interface 451), and can send the first information to the group of client devices via the second wireless network interface.

In some embodiments, the processor may be configured to determine, according to the first information (e.g., channel switch information 460), that the access point is to switch from the first channel (e.g., DFS channel) to a third channel (e.g., non-DFS channel). The first channel may be a dynamic frequency selection (DFS) channel, the third channel may be a non-DFS channel, and the first information may include a channel switch announcement (CSA). The processor may be configured to perform an interference resolution procedure (e.g., the standard 802.11h management procedure) for switching to the third channel (e.g., non-DFS channel). The processor may be configured to send, via the second wireless network interface (e.g., second wireless interface 452), the first information to the group of client devices within a determined time (e.g., 1 ms). The group of client devices can perform the interference resolution procedure according to the first information. In some embodiments, the interference resolution procedure is an 802.11h interference resolution procedure. In some embodiments, the determined time is less than or equal to one millisecond. In some embodiments, the processor may be configured to set a time limit (e.g., less than one second) for the group of client devices to switch to the third channel.

In some embodiments, the processor may be further configured to determine, according to second information (e.g., channel switch information 460), that the access point is to switch from the third channel (e.g., non-DFS channel) to a fourth channel (e.g., DFS channel) which is a DFS channel different from the first channel (e.g., DFS channel). The second information may be on (e.g., for use in) switching to the fourth channel (e.g., DFS channel). The processor may be configured to maintain the second wireless network interface (e.g., subgroup network interface) on the third channel until the access point successfully performs a channel availability check (CAC) on the fourth channel (e.g., DFS channel). In response to the access point successfully performing CAC on the fourth channel, the processor may be configured to switch to the fourth channel using the first wireless network interface (e.g., first wireless interface 451), and can send the second information to the group of client devices via the second wireless network interface (e.g., second wireless interface 452). For example, a subgroup network (and subgroup client devices (GC)) may maintain the current channel until the AP completes CAC, while the AP instructs a group owner (GO) through the interlink network interface with channel switch information and the GO relays the information to the GC through the subgroup network interface.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A first device, comprising:
a processor,
a first wireless network interface; and
a second wireless network interface,
wherein the processor is configured to:
  while associating with an access point over a first wireless network on a first channel via the first wireless network interface, establish a second wireless network via the second wireless network interface, wherein a group of client devices comprising one or more client devices can join the second wireless network on the first channel via the second wireless network interface;
  receive, via the first wireless network interface, first information from the access point; and
  send, via the second wireless network interface, the first information to the group of client devices,
  wherein the first information includes (1) switch information on switching from a non-dynamic frequency selection (DFS) channel to the DFS channel, or (2) a channel switch announcement (CSA) from a DFS channel to a non-DFS channel.

2. The device according to claim 1, wherein the processor is configured to:
  maintain the second wireless network via the second wireless network interface while the first wireless network interface is disconnected from the first wireless network.

3. The device according to claim 1, wherein the processor is configured to:
  determine, according to the first information, that the access point is to switch from the first channel to a second channel, wherein the first channel is a non-DFS channel, the second channel is a DFS channel, and the first information is on switching to the second channel; and
  maintain the second wireless network interface on the first channel until the access point successfully completes a channel availability check (CAC) on the second channel.

4. The device according to claim 3, wherein in response to the access point successfully completing the CAC on the second channel, the processor is configured to:
  switch to the second channel using the first wireless network interface; and
  send the first information to the group of client devices via the second wireless network interface.

5. The device according to claim 1, wherein the processor is configured to:
  determine, according to the first information, that the access point is to switch from the first channel to a third channel, wherein the first channel is a DFS channel, the third channel is a non-DFS channel, and the first information includes a channel switch announcement (CSA);
  perform an interference resolution procedure for switching to the third channel; and
  send, via the second wireless network interface, the first information to the group of client devices within a determined time, wherein the group of client devices can perform the interference resolution procedure according to the first information.

6. The device according to claim 5, wherein the determined time is less than or equal to one millisecond.

7. The device according to claim 5, wherein the processor is configured to set a time limit for the group of client devices to switch to the third channel.

8. The device according to claim 5, wherein the processor is further configured to:
  determine, according to second information, that the access point is to switch from the third channel to a fourth channel which is a DFS channel different from the first channel, wherein the second information is on switching to the fourth channel; and
  maintain the second wireless network interface on the third channel until the access point successfully performs a channel availability check (CAC) on the fourth channel.

9. The device according to claim 8, wherein in response to the access point successfully performing CAC on the fourth channel, the processor is configured to:
  switch to the fourth channel using the first wireless network interface; and
  send the second information to the group of client devices via the second wireless network interface.

10. A method, comprising:
  while associating with an access point over a first wireless network on a first channel via a first wireless network interface of a first device, establishing, by the first device, a second wireless network via a second wireless network interface of the first device, wherein a group of client devices comprising one or more client devices can join the second wireless network on the first channel via the second wireless network interface of the first device;
  receiving, via the first wireless network interface, first information from the access point; and
  sending, via the second wireless network interface, the first information to the group of client devices,
  wherein the first information includes (1) switch information on switching from a non-dynamic frequency selection (DFS) channel to the DFS channel, or (2) a channel switch announcement (CSA) from a DFS channel to a non-DFS channel.

11. The method according to claim 10, further comprising:
  maintaining, by the first device, the second wireless network via the second wireless network interface while the first wireless network interface is disconnected from the first wireless network.

12. The method according to claim 10, further comprising:
  determining, according to the first information, that the access point is to switch from the first channel to a second channel, wherein the first channel is a non-DFS channel, the second channel is a DFS channel, and the first information is on switching to the second channel; and
  maintaining, by the first device, the second wireless network interface on the first channel until the access point successfully completes a channel availability check (CAC) on the second channel.

13. The method according to claim 12, further comprising:
  in response to the access point successfully completing the CAC on the second channel:
  switching, by the first device, to the second channel using the first wireless network interface; and
  sending, by the first device, the first information to the group of client devices via the second wireless network interface.

14. The method according to claim 10, further comprising:
  determining, according to the first information, that the access point is to switch from the first channel to a third channel, wherein the first channel is a DFS channel, the third channel is a non-DFS channel, and the first information includes a channel switch announcement (CSA);
  performing an interference resolution procedure for switching to the third channel; and
  sending, via the second wireless network interface, the first information to the group of client devices within a determined time, wherein the group of client devices can perform the interference resolution procedure according to the first information.

15. The method according to claim 14, further comprising:
  setting a time limit for the group of client devices to switch to the third channel.

16. The method according to claim 14, further comprising:
  determining, according to second information, that the access point is to switch from the third channel to a fourth channel which is a DFS channel different from the first channel, wherein the second information is on switching to the fourth channel; and
  maintaining the second wireless network interface on the third channel until the access point successfully performs a channel availability check (CAC) on the fourth channel.

17. The method according to claim 16, further comprising:
  in response to the access point successfully performing CAC on the fourth channel:
  switching to the fourth channel using the first wireless network interface; and
  sending the second information to the group of client devices via the second wireless network interface.

18. A non-transitory processor-readable medium containing processor-readable instructions, such that, when executed by one or more processors, causes the one or more processors to:
  while associating with an access point over a first wireless network on a first channel via a first wireless network interface, establish a second wireless network via a second wireless network interface, wherein a group of client devices comprising one or more client devices can join the second wireless network on the first channel via the second wireless network interface;
  receive, via the first wireless network interface, first information from the access point; and
  send, via the second wireless network interface, the first information to the group of client devices,
  wherein the first information includes (1) switch information on switching from a non-dynamic frequency selection (DFS) channel to the DFS channel, or (2) a channel switch announcement (CSA) from a DFS channel to a non-DFS channel.

* * * * *